United States Patent [19]

Check, Jr.

[11] 4,060,720

[45] Nov. 29, 1977

[54] DATE PRINTING DEVICE WITH ELECTRONIC CALENDAR CLOCK

[75] Inventor: Frank Thomas Check, Jr., Orange, Conn.

[73] Assignee: Pitney Bowes Inc., Stamford, Conn.

[21] Appl. No.: 641,488

[22] Filed: Dec. 17, 1975

[51] Int. Cl.[2] .......................... G06F 11/00; G07C 1/30

[52] U.S. Cl. .............................. 235/309; 235/92 CA; 346/20

[58] Field of Search .......... 235/153 AS, 153 R, 92 T, 235/92 MP, 92 EC, 61.9 R; 346/20, 81, 91, 78, 141, 142; 179/7.1 R, 7.1 TP

[56] References Cited

U.S. PATENT DOCUMENTS

| | | | |
|---|---|---|---|
| 2,137,493 | 11/1938 | Johnson et al. | 346/142 |
| 2,911,279 | 11/1959 | Pollak, Jr. et al. | 346/91 |
| 2,971,056 | 2/1961 | Deerfield | 235/153 AS |
| 3,158,426 | 11/1964 | Doersam, Jr. et al. | 346/20 |
| 3,231,671 | 1/1966 | Blashfield | 179/7.1 TP |
| 3,573,360 | 4/1971 | Rose, Jr. | 346/20 |
| 3,638,229 | 1/1972 | Schinner | 346/24 |
| 3,886,329 | 5/1975 | Kamiyama | 235/92 CA |

*Primary Examiner*—Charles E. Atkinson
*Attorney, Agent, or Firm*—Donald P. Walker; William D. Soltow, Jr.; Albert W. Scribner

[57] ABSTRACT

A date printing device, such as a postal meter, includes an electronic calendar clock which generates and stores signals representing different days and months of the year. The electronic calendar clock provides one input to a comparison circuit. Another input to the comparison circuit is provided by an encoder which generates signals representing the current setting of the date printing device. The comparison circuit samples inputs from the calendar clock and the encoder and generates a control signal when a mismatch is detected.

10 Claims, 8 Drawing Figures

DATE PRINTING DEVICE WITH ELECTRONIC CALENDAR CLOCK

BACKGROUND OF THE INVENTION

The present invention relates to a date printing device such as a postal meter and more particularly to a date printing device employing an electronic calendar clock in a checking and/or setting circuit.

The date stamping of documents and envelopes is an integral and indispensable part of commerce. Many classes of mail require the day, month and year being included as part of a postal meter imprint. Also, some business establishments use automatic date printing devices to record the time receipt of incoming mail. Presently, the user of such devices must remember to manually update the setting of the printing device each day. Through error and neglect, the user may set in a wrong date or may forget to update the setting.

Since a date of mailing or a date of receipt can be critical in business transactions or for tax purposes, a user's opportunities to inadvertently or negligently set a wrong date into a date printing device should be minimized.

SUMMARY OF THE INVENTION

The present invention is a date checking and/or setting system which may be used to check and/or set the current date of a printing device against the setting of an electronic calendar clock.

In one embodiment, the system includes a clock means which generates sets of electrical signals, each representing a different day of a calendar month. And includes encoding means associated with the date printing device for generating a set of signals representing the current setting of the device. Means are connected to both the clock means and the encoding means for comparing the clock-generated signal set with the encoder-generated signal set. An appropriate control signal is generated when a mismatch is detected.

DESCRIPTION OF THE DRAWINGS

While the specification concludes with claims particularly pointing out and distinctly claiming that which is regarded as the present invention, further objects and advantages of particular embodiments of the invention may be more readily ascertained from the following detailed description, read in conjunction with the accompanying drawings, wherein:

DETAILED DESCRIPTION

Figure 1:
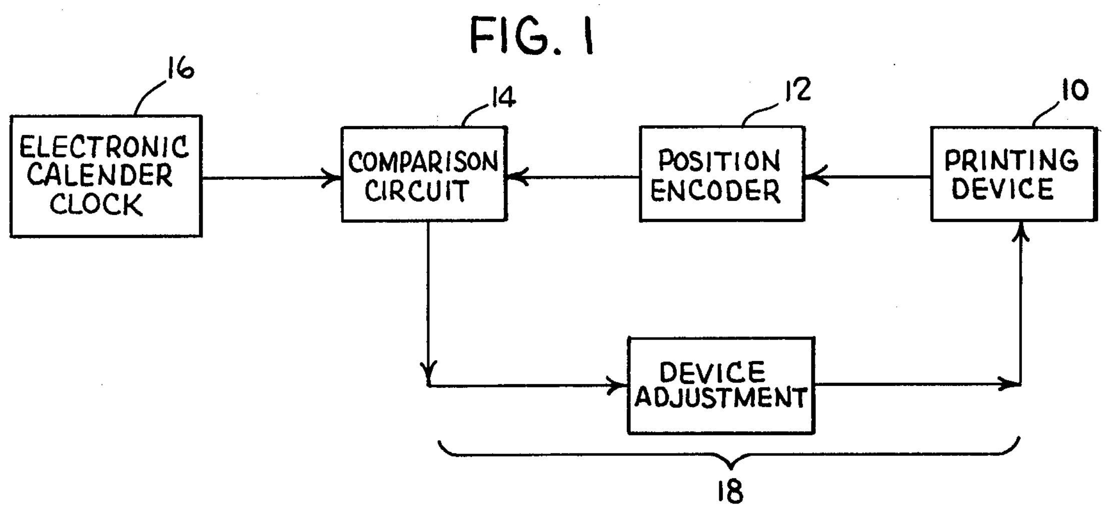
FIG. 1 is a basic block diagram of a system constructed in accordance with the present invention.

Referring to FIG. 1, a date checking system constructed in accordance with the present invention is used in combination with a date printing device 10 which, by itself, may be conventionally constructed. The date printing device 10 is coupled through an encoding means or position encoder 12 to a comparison circuit 14 having a second input from an electronic calendar clock 16. The function of the position encoder 12 is to generate a set of electrical signals indicative of the current setting of the date printing device 10. These encoder-generated signals are compared with clock-generated signals in the comparison circuit 14. When the two sets of signals fail to match, indicating the electronic calendar clock date does not match the date currently set in the date printing device 10, a control signal is generated by comparison circuit 14. This control signal is employed in a device adjustment loop 18.

Details of certain embodiments of the date printing device 10, the position encoder 12, the comparison circuit 14, the electronic calendar clock 16 and the device adjustment loop 18 are provided in the following paragraphs.

Figure 2:
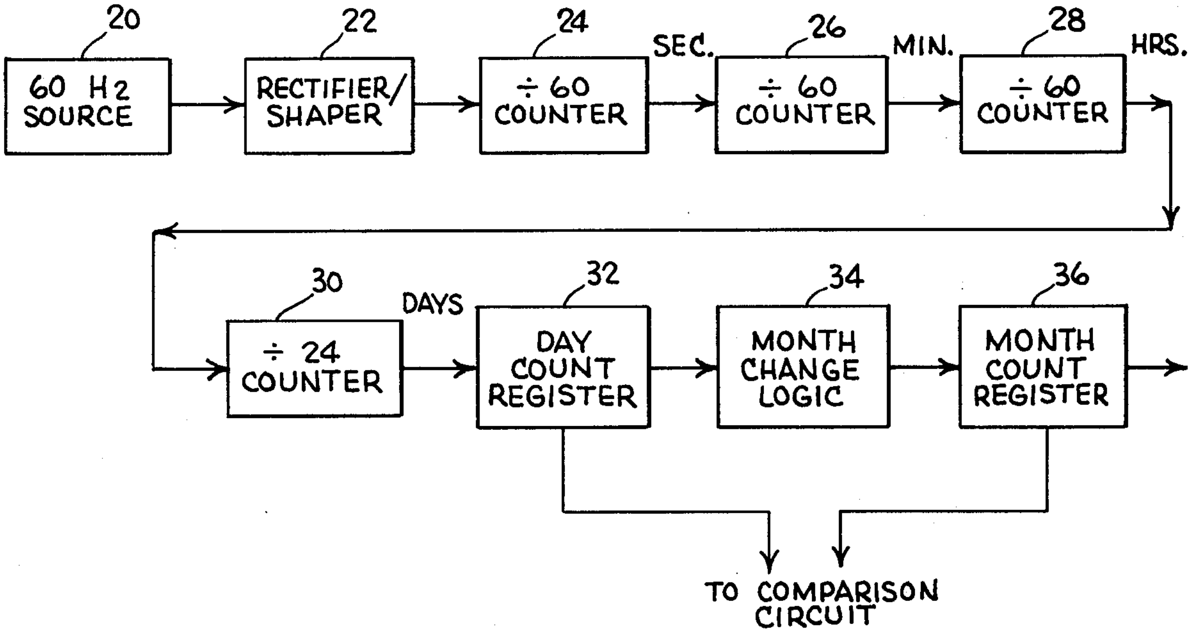
FIG. 2 is block diagram of one embodiment of an electronic calendar clock for use in the system.

Referring now to FIG. 2, the electronic calendar clock 16 may make use of a conventional 60 Hz, 110 volt source 20 both as a power supply and as a time reference. The use of the source 20 as a power supply is conventional and thus is not shown. The 60 Hz sinusoidal wave form generated by source 20 is applied to a rectifier/shaper circuit 22 which blocks either the positive or the negative half of each cycle while performing a shaping operation on the unblocked half cycles. The shaping is usually a squaring operation in which the source voltage is clipped at a predetermined maximum level. The output of the rectifier/shaper circuit 22 is thus a train of square waves having a nominal frequency of 60 Hz.

The actual frequency of a nominally 60 Hz source may vary slightly from time to time. However, If the variation exceeds certain limits, the utility generating the 60 Hz voltage automatically introduces compensating variations during each 24-hour period. For example, if the source frequency inadvertently becomes 59 Hz for 3 seconds, the utility will intentionally boost the source frequency to 61 Hz for three seconds later in the 24-hour period. Thus, over a 24hour day, the actual average frequency of the source 20 deviates insignificantly, if at all, from the nominal 60 Hz frequency.

The square wave produced by the rectifier/shaper circuit 22 is applied to a chain of counters 24, 26, 28 30, and 32, connected in series. The first counter 24 divides the number of pulses received from rectifier/shaper circuit 22 by a factor of 60 to produce one output pulse per second. The second counter 26 divides the output of the counter 24 by a factor of 60 to produce one output pulse per minute. The pulses produced by the counter 26 are further divided by a factor 60 by the third counter 28, which generates one output pulse per hour. The hourly pulses are applied to a divide-by-24 counter 30 which produces one pulse per day at its output. The daily pulses are applied to a day count register 32 capable of storing a unique set of signals for each of the 31 days in a calendar month.

Integrated circuits capable of providing calendar clock signals are commercially available. An example of one such circuit is a MK 5017BB calendar clock circuit manufactured and marketed by Mostek Corporation.

The internal organization of commercially available calendar clock circuits may differ from the organization of the circuit described above. However, such circuits will normally generate and count pulses indicating minutes, hours and possibly days.

A month change logic circuit 34 is made necessary by the fact that not every month is 31 days long. Possible embodiments of circuit 34 are described later. The output of the circuit 34 is applied to a month count register 36 capable of generating a unique set of electrical signals representing each of the 12 months in a calendar year. Outputs from the day count register 32 and the month count register 36 are applied to the comparison circuit 14 where they are checked against signals representing the day and month currently set into the date printing device 10. A possible comparison technique is described in more detail with reference to FIG. 3.

Figure 3:
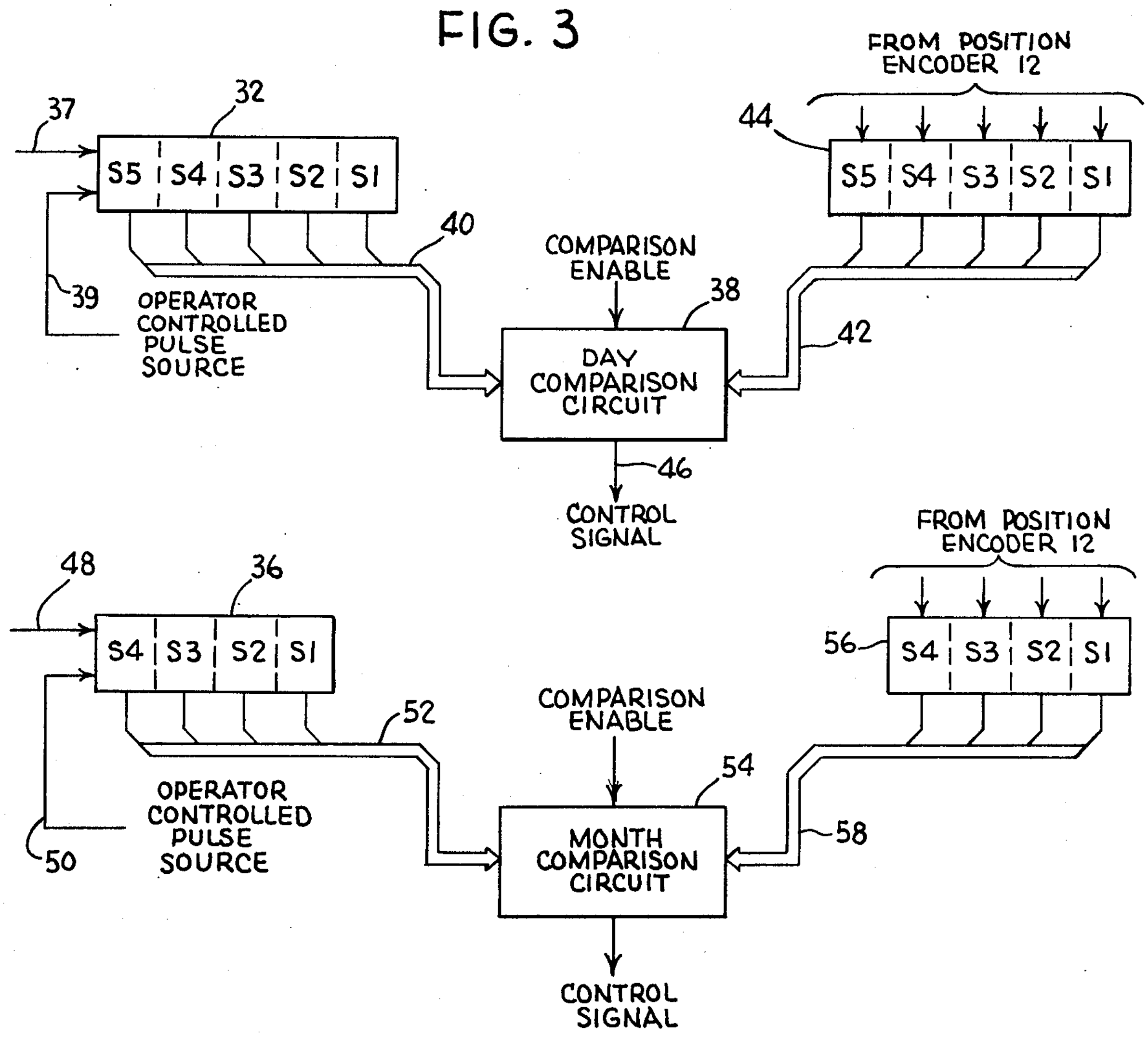
FIG. 3 illustrates certain details of a possible comparison circuit for the system.

In FIG. 3, day count register 32 is shown as a five stage register or counter in which the stages S1 through S5 are connected in series. Pulses generated at the output of counter 30 are applied to stage S5 of register 32 through an input 37 and are propagated through the succeeding stages S4 through S1 in conventional fashion.

A second input 39 to stage S5 is connected to an operator controlled pulse source and may be employed to correct any known error in the setting of the day-count register 32. Such an error could be the result of a loss of power from the 60 Hz source. To assure that the electronic calendar clock does not become erroneously set due to a temporary loss of power which remained undetected by an operator (e.g., a power outage occurring between midnight and dawn), the logic associated with the electronic calendar clock may include a conventional power-loss indicating circuit. Such a circuit may cause the output of the calendar clock to be driven to and latched at a predetermined output (e.g., all 8's) on a loss of power. The output alerts the operator that a power loss has occurred and that the electronic clock must be reset.

While the input to the day count register 32 is serial, the output from the register 32 is parallel. An output lead connects each of the stages S1 through S5 to a day-comparison circuit 38. To simplify the drawing, the output leads from the stages S1 through S5 are shown merging into a cable 40 leading to the comparison circuit 38.

A second array of inputs is applied to the day comparison circuit 38 through a cable 42 containing leads from each of the five stages S1 through S5 of a second register 44. The register 44 is connected to the position encoder 12 and, at any given time, serves to store signals representing the date set into the printing device 10.

The function of the day-comparison circuit 38 is to compare the contents of the registers 32 and 44; that is to determine whether the date currently set in the printing device 10 matches the date set into register 32 by the electronic calendar clock 16. In simplest form, the day-comparison circuit 38 could include five AND gates, with each AND gate having inputs from corresponding stages in the registers 32 and 44. Each AND gate would also have a third input to enable the gate only at a specific time or times.

Simple logic circuitry may be employed to assure the comparison is performed at a time that it is convenient for the user; for example, at a time before the date printing device is to be put into use in a normal business day. For example, if the comparison is to occur at 1 A.M. each day, and AND gate could be connected to the stages of the counter 30 to determine when the counter is storing the set of signals representing that time period. If a high level output represents the enabled condition, this output could be employed to trigger a one-shot multivibrator to provide the comparison enabling input to the day-comparison circuit 38.

If the signal stored in the stages of the register 32 are identical to the signals stored in the corresponding stages of the register 44, no control action is required. However, any mismatch between signals stored in corresponding stages of the two registers indicates some discrepancy between the electronic calendar clock date and the date setting of the printing device 10. When a mismatch is detected, a control signal is generated at an output 46. The control signal can serve different functions, two of which are described in more detail later.

The comparison circuit also includes circuitry for comparing the month generated in the electronic calendar clock 16 with the month set into the printing device 10. Month count register 36 is shown as a four-stage register having serially connected stages S1 through S4. Signals generated as a result of the operation of month change logic circuit 34 are applied through an input lead 48 to stage S4 and are propagated through the successive stages S3 through S1 in conventional fashion. A second input 50 may be provided to stage S4 of register 36 from an operator controlled pulse source. Like the previously discussed and corresponding input 39 to day count register 32, the input 50 would be used to correct any known error in the setting of the month-count register 36. Parallel outputs from the stages S1 through S4 of register 36 are applied via a cable 52 to a month-comparison circuit 54.

Inputs representing the current month setting of the printing device 10 are stored in another four-stage register 56 having inputs from the position encoder 12 and parallel outputs which are applied to the month-comparison circuit 54 via a cable 58. Like the day-comparison circuit 38, the month-comparison circuit 54 may consist of AND gates having inputs from the corresponding stages from the registers 36 and 56. Each AND gate would also have a comparison enabling input to trigger comparison of the month signals generated by the electronic calendar clock 16 and the month signals representing the current setting of the printing device 10. For convenience, the same comparison enabling signal might be applied to both of the comparison circuits 38 and 54.

Figure 4:
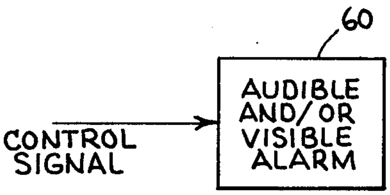
FIG. 4 illustrates one use for a control signal generated in the comparison circuit.

Control signals generated by the comparison circuits 38 and 54 may serve different functions depending upon the level of system sophistication. Referring to FIG. 4, a control signal might be applied to an auditory and/or visual alarm device 60 which would alert an operator that a discrepancy exists between the dates in the electronic calendar clock 16 and in the printing device 10. The operator would be responsible for correcting the setting of device 10.

Figure 5:
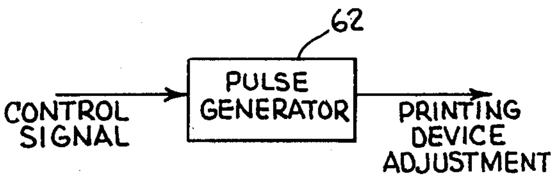
FIG. 5 indicates another use for the control signal generated in the comparison circuit.

In a more sophisticated embodiment, a control signal might be used to trigger a pulse generator 62, as shown in FIG. 5. Output pulses from the pulse generator 62 could be used to increment or adjust the setting of the printing device 10, without operator intervention, 1 day (or 1 month) at a time until the mismatch condition has disappeared.

Where the date printing device 10 is automatically updated, the system preferably includes a manual override for inhibiting operation the automatic updating feature of device 10, to permit to having a date printed which differs from the electronic calendar clock date. Such an override is very useful since U.S. Postal regulations require that metered mail carry the date of actual mailing. By employing a manual override, a mailing department may process (and post date) mail as its workload permits. The processed mail can be held until the proper mailing date.

In another embodiment, a control signal might be used to activate any well-known means for inhibiting operation of the device 10 in the event that the calendar clock and the date setting of the device 10 do not agree with one another. In which case, operator controllable means well-known in the art may be provided for enabling the meter for post dating purposes.

Where the updating of the date printing device 10 is not automatically performed, the system requires no manual override since the operator is free to change the setting at his discretion.

For either type of system, an alarm, preferably visual, would remain energized during manual override operations to remind the operator to restore the system to its normal mode of operation.

Figure 6:
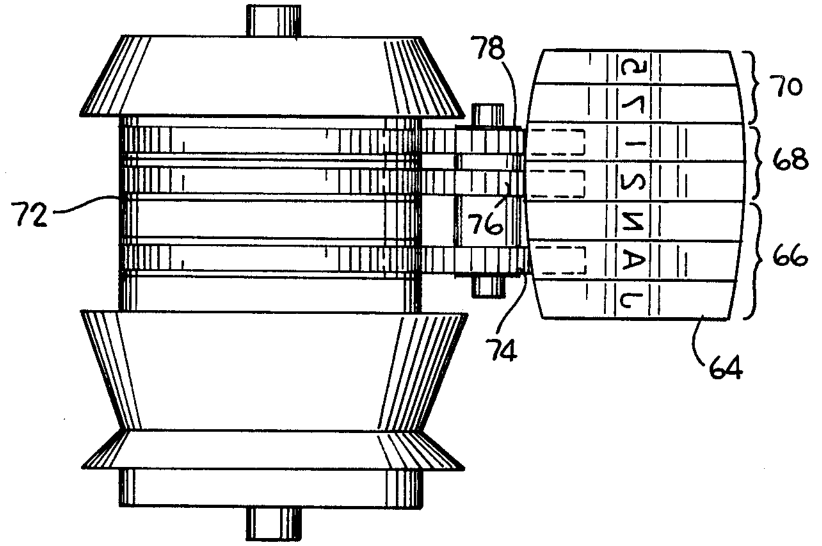
FIG. 6 is a top view of an embodiment of a date printing device that might be used in conjunction with the present invention.

Referring to FIG. 6, date printing device 10 is illustrated as a print drum 64 having a month indicia band 66, a pair 68 of day indicia bands and a pair 70 of year indicia bands. The month band 66 and day bands 68 are coupled to date setting wheels shown collectively at 72 through transfer gears 74, 76 and 78. A position encoding disk may be coupled to each of the transfer gears 74, 76 and 78 to detect the angular setting of the transfer gear and thus the current setting of the associated band in the drum 64.

Figure 7:
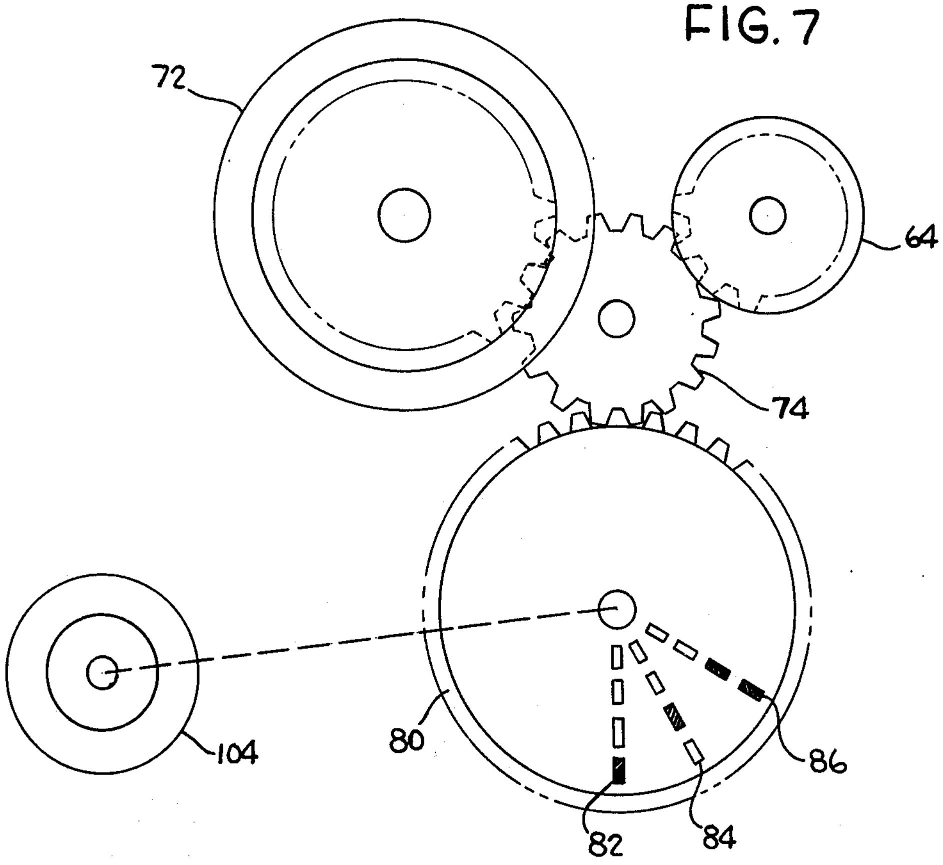
FIG. 7 is a side view of the date printing device shown in FIG. 6, but also showing position encoding and adjusting means.

Referring to FIG. 6 and 7, the position sensing disk 80 for the month band 66 would have 12 equiangularly spaced sets of sensible binary markings extending along radii from the disk center. Only three sets 82, 84, 86 are illustrated. A conventional light source photocell arrangement could be used to sense the binary indicia on the radii extending vertically downward from the disk center. In FIG. 7, the set 82 would have a binary value 1 and could represent the month of January. Similarly the sets 84 and 86, having binary values of 2 and 3 respectively could represent the months of February and March respectively. Similar disks (not shown) would be used to provide sets of binary-encoded signals representing the settings of the day bands 68.

To provide automatic adjustment for the setting of the date printing device 10, stepping motor 104 could be coupled to position encoding disk 80 to step the disk through a predetermined angle (30° for the month encoding disk) of rotation until the mismatch condition disappears. Similar servomotors (not shown) would be used to adjust the settings of the day bands.

In one embodiment of the invention, only the correctness of the day set into printing device 10 might be checked. The month setting would remain the responsibility of the operator. To assist the operator in discharging this responsibility, a warning signal of flag could be generated by logic circuitry associated with day-count register 32. The circuitry would respond to a day count of 28 (the minimum number of days in any calendar month) or more by generating a signal, preferably visual, reminding the operator to check the month setting.

It is possible to employ logic which would automatically check both the day and the month and which would provide the necessary updating at month's end. Rather than illustrate all of the details of the logic circuitry only the logic flow chart is discussed.

Figure 8:
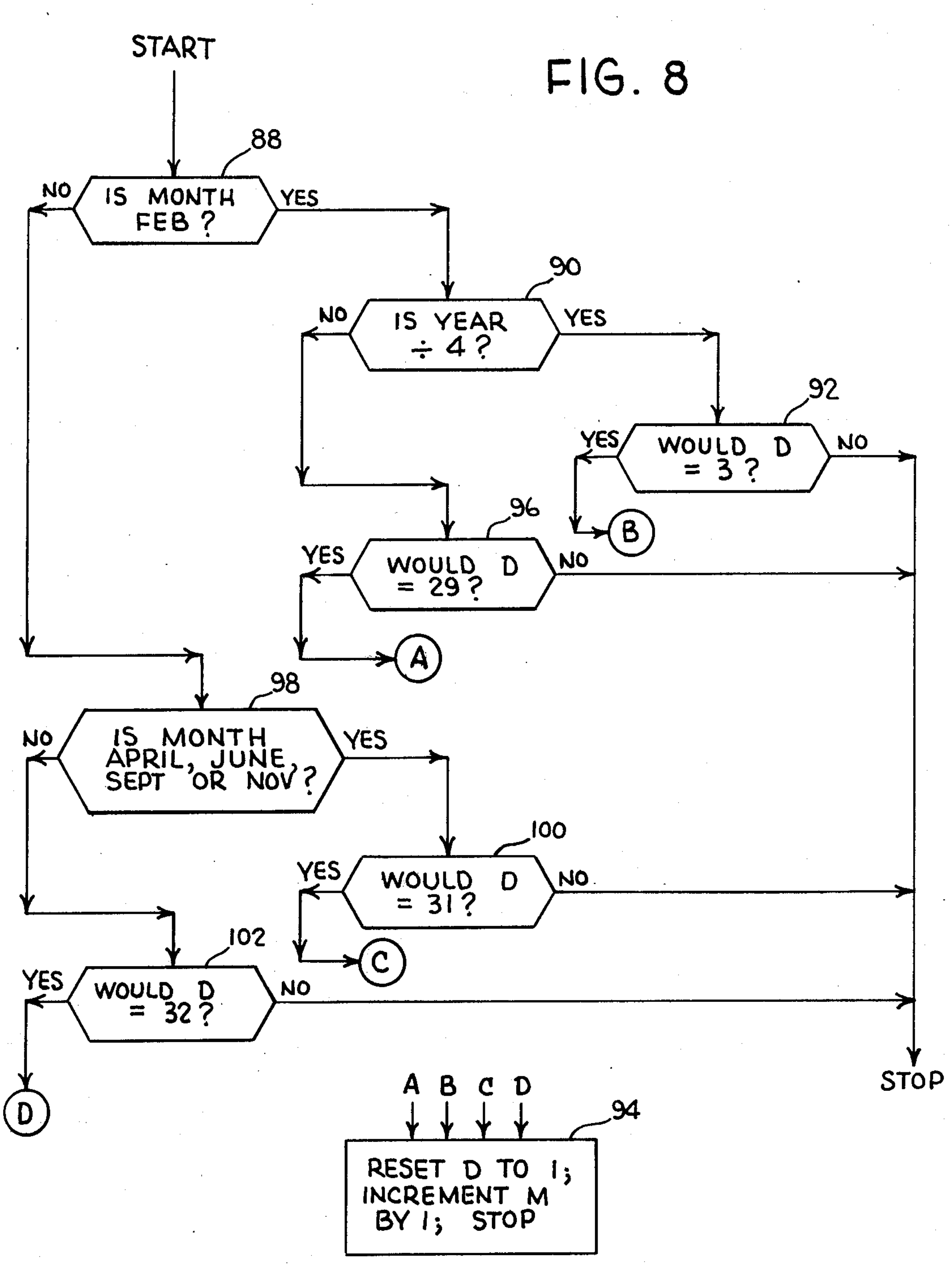
FIG. 8 is a flow diagram which illustrates logic for an automatic month-change feature employed in one embodiment of the invention.

Referring to FIG. 8, a first decision block 88 calls for a determination whether the month is February. If the answer is positive, a decision block 90 requires a determination whether the year is divisible by four. If the year is divisible by four without remainder, the year is a leap year and February is 29 days long. A positive response at decision block 90 leads to a decision block 92 where a decision must be made whether the number of days accumulated in the day-count register would equal 30 if left unchanged. A negative answer at the decision block 92 means that the end of the month has not been reached. The logic would be inhibited until the next change in contents of the day-count register 32.

If, however, the answer at decision block 92 is positive, the output B triggers update logic, illustrated only as block 94, which would operate to reset the contents of the day-count register 32 to 1, to increment the contents of the month count register 36 by 1 (from February to March) and to then inhibit the logic until the next comparison is performed.

A negative response at decision block 90, indicating the year is not a leap year, leads to a decision block 96. There, a determination is made whether the day-count register would show twenty nine days if not altered by the logic. A negative answer indicates the end of February has not been reached. A positive answer initiates the update logic illustrated in block 94.

Returning to the top of FIG. 8, a negative answer at decision block 88 leads to a decision block 98 calling for a determination whether the current month is April, June, September or November, all of which are 30 days long. A positive response at decision block 98 leads to a decision block 100 where a determination is made whether the day count register would show 31 days if unchanged. A negative answer indicates the end of the month has not been reached. The month change logic is then inhibited until the next comparison. A positive response at decision block 100 initiates the undate logic depicted as block 94.

A negative response at decision block 98 must logically mean the month is January, March, May, July, August or December, all of which are 31 days long. All shorter months are eliminated at decision blocks 88 and 98. For that reason the negative branch from decision block 98 leads directly to a decision block 102 where a determination is made whether the day count register would show a count of 32 if unchanged. A negative answer indicates the end of the particular month has not been reached. A positive answer initiates the update logic of block 94 to reset the day-count register to 1 while updating the contents of the month-count register 36.

While the specification has not described logic for checking and/or automatically updating the year, the subject matter hereinbefore described may be easily modified by persons skilled in the art to do so. For example, if month count stored in register 36 equals 12 and day count stored in register 32 equals 32 (if not changed) the logic conclusion is that the year count must be incremented by one as the month and day counts are reset to one. Of course, a warning signal or flag could be generated to remind the operator to perform necessary updating where automatic updating is not desired.

While particular embodiments of the invention have been described, variations and modifications of those embodiments will occur to those skilled in the art once they become familiar with the basic concepts of the invention. For example, the electronic calendar clock 16 might employ a battery-powered, crystal-controlled oscillator capable of producing an accurately-controlled high frequency output signal. The output signal generated by the oscillator could be divided down in appropriate counters to derive the necessary pulses to indicate changes in seconds, hours, days and possibly months. Furthermore, the invention could be used in combination with a printing device other than a mechanical impact printer. A directly driven non-impact printing device, such as an ink jet printer, might be used and the encoder eliminated to realize the basic concepts of the invention.

For that reason, it is intended that the appended claims shall be construed to cover all such variations and modifications as fall within the true spirit and scope of the invention.

What is claimed is:

1. For use with a date printing device capable of printing symbols representing the days of the month, a date checking system comprising;

a. clock means for generating sets of electrical signals, each set representing a particular day of a calendar month;

b. an encoder associated with the date printing device for generating a set of electrical signals representing the current setting of the device;

c. means connected to said clock means and said encoder for comparing the clock-generated signals with the encoder-generated signals;

d. means responsive to the output of said comparing means for indicating a mismatch condition between the compared signals; and e. means for coupling said comparing means to the date printing device, said coupling means being responsive to a mismatch signal to adjust the setting of the date printing device in increments until the mismatch condition has disappeared.

2. The date checking system as recited in claim 1, wherein said indicating means includes an alarm device for bringing the mismatch condition to the attention of an operator.

3. The date checking system as recited in claim 1, wherein the indicating means includes means for generating a signal for inhibiting automatic operation of the date printing device to prevent inadvertently printing a mismatch date, and includes operator controllable means for choosing a date for the date printing device.

4. The date checking system as recited in claim 3, including means for preventing the operator from choosing a date earlier than a predetermined date.

5. For use with a date printing device capable of printing symbols representing days and months, a date checking system comprising:

a. clock means for generating sets of electrical signals, each set representing a particular day of a month or a particular month of the year;

b. an encoder associated with the date printing device for generating sets of electrical signals representing the current setting of the device;

c. means connected to said clock means and said encoding means for comparing the clock-generated signals with the encoder-generated signals; and e. said clock means including logic means responsive to the currently stored signals representing a month and to the currently stored signals representing a day for updating the month-representing signals following the last calendar day of the month.

6. The date checking system as recited in claim 5 wherein said clock means is connected to a source of 60 Hz power and further comprises:

a. means for dividing the number of 60 Hz cycles by a constant to derive one pulse for each 24 hour period during which power is supplied to the clock means; and b. means for storing a count of the number of pulses generated by said first-name means.

7. The date checking system as recited in claim 5 including means responsive to the output of said comparing means for indicating any mismatch between the compared signals.

8. The date checking system as recited in claim 7, wherein said indicating means includes an alarm device for bringing the mismatch condition to the attention of the operator.

9. The date checking system as recited in claim 7, wherein the indicating means includes means for generating a signal for inhibiting automatic operation of the date printing device to prevent inadvertently printing a mismatch date, and operator controllable means for choosing a date for the date printing device.

10. The date checking system as recited in claim 9 including means for preventing the operator from choosing date earlier than a predetermined date.

* * * * *